Jan. 2, 1934.   R. H. SHEPARD   1,942,189
MECHANISM FOR CONTROLLING ENGINE VALVE MECHANISMS
Filed Sept. 12, 1929   3 Sheets-Sheet 1
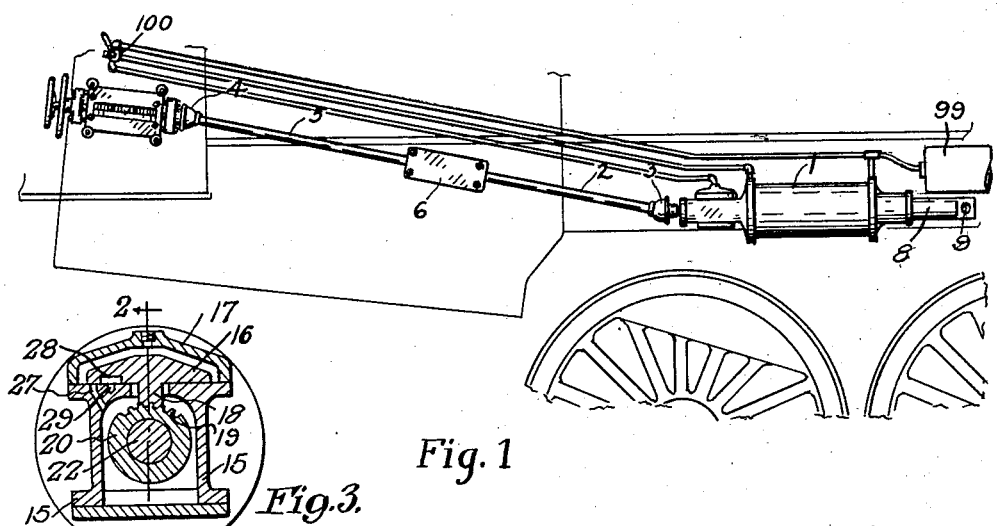
Fig. 1
Fig. 3.
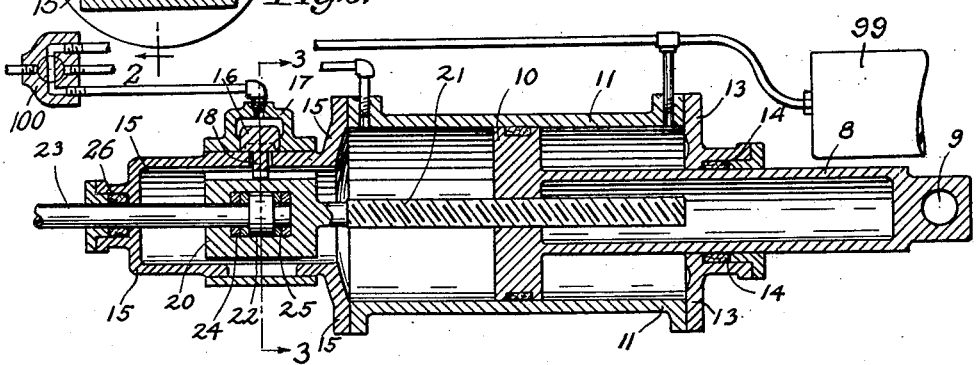
Fig. 2
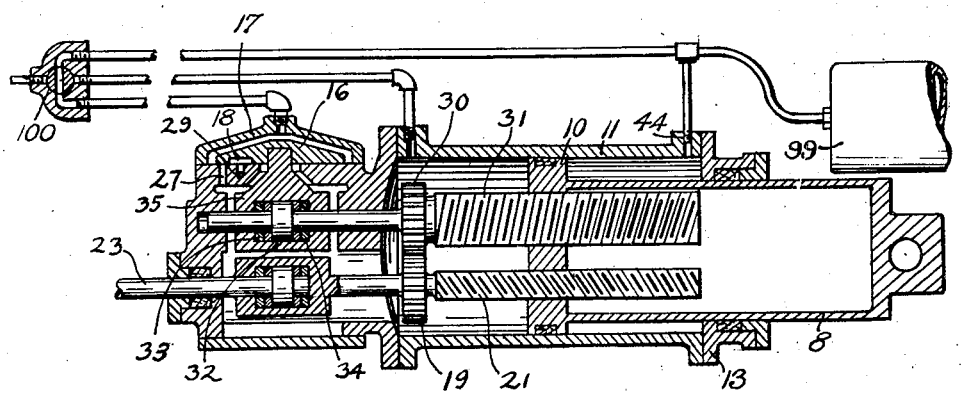
Fig. 4
INVENTOR
Ralph H. Shepard
BY
ATTORNEY Jan. 2, 1934.  R. H. SHEPARD  1,942,189
MECHANISM FOR CONTROLLING ENGINE VALVE MECHANISMS
Filed Sept. 12, 1929  3 Sheets-Sheet 2

INVENTOR
Ralph H. Shepard
BY
ATTORNEY

Jan. 2, 1934.  R. H. SHEPARD  1,942,189
MECHANISM FOR CONTROLLING ENGINE VALVE MECHANISMS
Filed Sept. 12, 1929  3 Sheets-Sheet 3

INVENTOR
Ralph H. Shepard
BY
ATTORNEY

Patented Jan. 2, 1934

1,942,189

UNITED STATES PATENT OFFICE 1,942,189

MECHANISM FOR CONTROLLING ENGINE VALVE MECHANISMS

Ralph H. Shepard, Bronxville, N. Y.

Application September 12, 1929
Serial No. 392,106

2 Claims. (Cl. 121—41)

This invention relates to means for operating and positively controlling power mechanism, and more especially to a mechanism for operating and controlling reversing gears for engine valve mechanisms.

A reversing gear such as is used on a locomotive is generally controlled by a lever, a crank, or a hand wheel located in the cab of the locomotive. It may consist of a system of links or rods, and levers, or a screw mechanism connected to the locomotive valve gear. In many instances, however, the reversing gear in power operated, and includes a piston in a cylinder, actuated by fluid under pressure, and connected by suitable means to the valve gear. While such reversing gears greatly augment the power available for controlling the locomotive valve gears, they are subject to varying degrees of inaccuracy, depending as much on the design as the condition of wear of the reversing gears. Those designs which give the greatest accuracy of adjustment and control are frequently the most difficult to operate.

An object of this invention is to provide a power mechanism, such as reversing gear, which may be used for controlling engine valve mechanisms, which will have and hold a high degree of accuracy of adjustment and control, and which can be operated very quickly and easily.

A further object is to provide a device for transmitting rotating motion from one shaft to another shaft parallel thereto and also delivering to the one shaft longitudinal movement proportional to the movement in the other shaft but in a direction opposite thereto.

All these and other objects as suggested hereinbelow are attained by the means now to be described, and illustrated in the accompanying drawings, in which—

Figure 1 is a side elevational view of a power reversing gear as applied to a locomotive together with its controlling mechanism.

Fig. 2 is a vertical longitudinal sectional view of a simplified form of reversing gear in an embodiment somewhat different than that of Fig. 1, and which is controlled by the longitudinal movement or position of a rod.

Fig. 3 is a vertical lateral sectional view of the same device through the plane 3—3 of Fig. 2.

Fig. 4 is a longitudinal sectional view of a slightly modified form of reversing gear.

Figure 9:
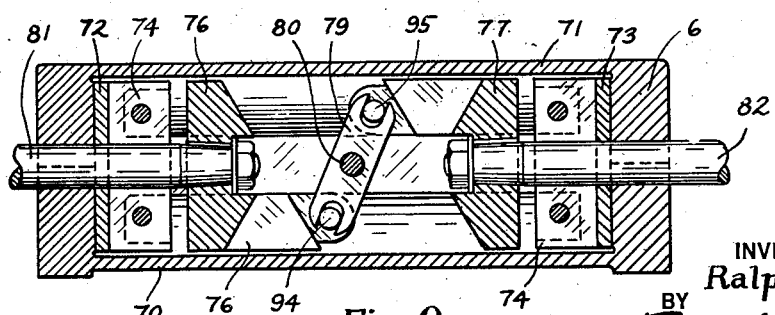

And Fig. 9 shows a longitudinal section through the assembly, of a device which will transmit rotary movement, and also reverse longitudinal movement in the same line.

Figure 5:
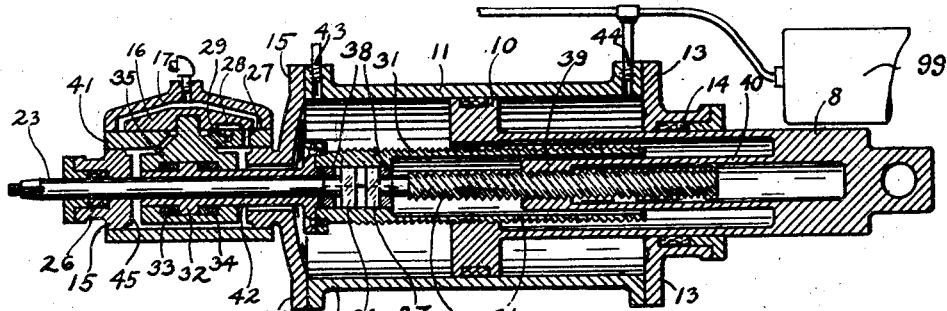
Fig. 5 is a vertical longitudinal section through the preferred form of reversing gear which is controlled by longitudinal movement and/or rotation of a rod or shaft.
Figure 7:
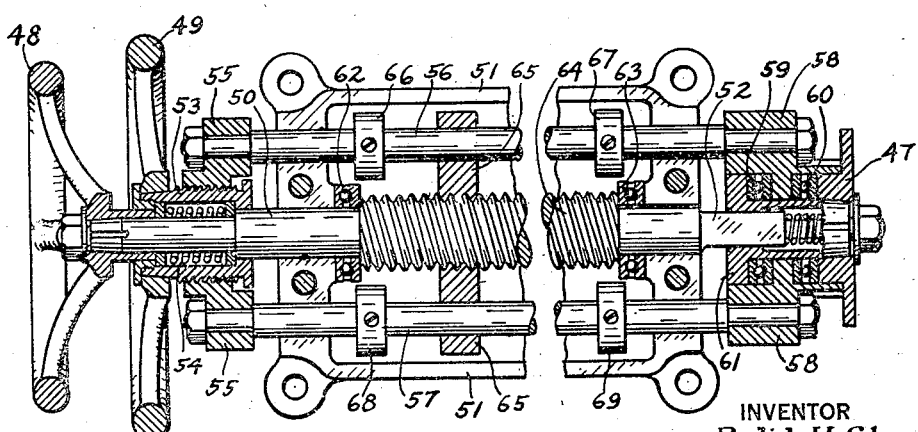
Fig. 7 is a vertical longitudinal sectional and elevational view, mutilated, through a controlling device such as would be suited to operate the reversing gears shown in Fig. 5, and which device imparts either rotary or longitudinal movement to a shaft attached to it, upon rotation of the proper wheel, crank, or other rotative means.

This device is used to compensate for boiler expansion between the points of attachment of the controlling device shown in Fig. 7, and a power reversing gear shown in Fig. 5, although its usefulness is not limited thereto.

Like numerals refer to like parts throughout the several views.

In Fig. 1 the reversing gear 1 is shown attached to the locomotive boiler. Movement of its operating valve, located in the rear head of the cylinder, is controlled by the rods 2 and 5 through the universal joints 3 and 4 which take care of misalignment, both rods working through a compensating device 6, such as shown in Fig. 9. Universal joint 4, Fig. 1, is connected to a controlling device 7, which is generally located in the cab of the locomotive, and which is preferably of the type shown in Fig. 7.

Fluid under pressure for operating the device is supplied from the reservoir 99 and the device is locked by the valve 100.

The valve gear of a locomotive is generally connected through a suitable link to the piston rod or trunk 8 of the reverse gear 1 by a pin through the hole 9 in the end of the trunk. Change of adjustment of the locomotive valve gear is affected by movement forward or back of the said trunk which is controlled by the control mechanism through rods 2 and 5.

The reversing gear, Fig. 2, shows the trunk 8 integral with piston 10 located within cylinder 11. This cylinder has a removable front head 13 and rear head 15. Trunk 8 extends through the front head 13, which is sealed with a suitable stuffing box 14. Over rear head 15, Figs. 2 and 3, is mounted a slide valve 16, in the valve chest 17. Movement of this valve, by a suitable rack 18, is effected by teeth 19 on cage 20 which rotates to effect valve movement. Cage 20 carries screw 21, whose threads are of sufficient pitch to be reversible. This screw 21 is threaded into piston 10.

Within cage 20 is collar 22 of control rod 23. Suitable thrust bearings 24 and 25 are fitted on each side of the collar 22. Where the control rod passes through the rear head of the reverse gear is fitted a stuffing box.

When control rod 23 is thrust to the right cage 20 is also carried forward and in turn carries screw 21. If this screw be threaded right hand as shown, and piston 10 remains stationary, screw 21 and hence cage 20 must rotate, clockwise in the view shown in Fig. 3. Therefore, through teeth 19 and rack 18, valve 16 will be moved toward the right. This will admit fluid at working pressure from valve chest 17 through port 27 to the left end of the cylinder. Fluid at working pressure is constantly furnished to valve chest 17 through valve 100 from reservoir 99 except when the device is locked. Similarly, if the control rod 23 is withdrawn toward the left in Fig. 2, the valve will be moved toward the left in Fig. 3. Then the fluid from the rear end of the cylinder can pass through port 27, valve cavity 28, and exhaust port 29, out of the reversing gear.

Movement of the piston is effected by the relation of fluid pressures on each side of it. A high pressure on the left and a low pressure on the right of it would result in movement to the right, and conversely a low pressure on the left and a high pressure on the right would produce leftward movement of the piston and parts attached thereto. Observe, however, that since trunk 8 which has considerable cross-section area extends through the front head 13 to the atmosphere, the effective area on the right of the piston outside of this trunk is less than the area on the left of the piston. Therefore fluid at equal pressure per unit area, greater than atmospheric pressure, acting simultaneously on each side of the piston, will not produce equilibrium but will tend to drive the piston to the right. If, however, the fluid pressure per unit area acting on the right of the piston is sufficiently in excess of that acting on the left, it will tend to drive the piston to the left. A condition somewhere between these extremes will produce equilibrium and permit the piston to remain at rest.

Thus it will be seen that this reversing gear can be operated by furnishing fluid constantly at working pressure to the right end of its cylinder, and controlling the pressure in the left end only, by a suitable valve. For purposes of illustration the valves shown in the drawings for each type or modification of reversing gear controls the left end pressure only and the right end is directly connected with the fluid reservoir 99, but of course the invention is not limited to such an arrangement.

The reversing gear shown in Fig. 4 differs from that in Fig. 2 in that the gear 19 which rotates with large pitch reversible screw 21 does not move valve 16 transversely directly through a rack, but instead rotates gear 30 attached to another screw 31, the resulting longitudinal movement of which moves the valve in the same direction in the manner as illustrated. Thus if the control rod is thrust to the right screw 21, being threaded right hand, will turn clockwise looking toward the right. Then screw 31 will be turned counter-clockwise and will move to the right, being threaded left hand as shown. It will therefore move the valve to the right by the means described above, which will admit fluid at working pressure from valve chest 17, through port 27, to the left end of the cylinder. Similarly, if control rod 23 is pulled to the left, the valve will be moved to the left and will exhaust fluid from the left end of the cylinder in the same manner as that described for the reversing gear in Fig. 3.

Screw 31, like reversible screw 21, is threaded into piston 10. Thus, if the valve 16, Fig. 4, has been moved to the right by a thrust to the right on control rod 23, the pressure of fluid admitted to the left end of the cylinder will start movement of the piston to the right. Then, if control rod 23 is held stationary in its last position, screw 21 will be rotated counter-clockwise, looking toward the right, by the moving piston. Through gears 19 and 30, screw 31 will therefore be rotated clockwise. Now if the gears have a one-to-one ratio and the screws have the same lead, or if the gear ratio is the same as the ratio of leads of the screws, the screws will recede from the moving piston at the same rate. If rod 23 and therefore screw 21 have no longitudinal motion, neither will screw 31 move longitudinally. And so valve 16 will remain open, resulting in continuous operation or movement of the piston, within the limits of its stroke, so long as rod 23 is held in rightward operating position. Likewise continuous operation or piston movement to the left will result so long as rod 23 is held in its leftward operating position.

Figure 6:
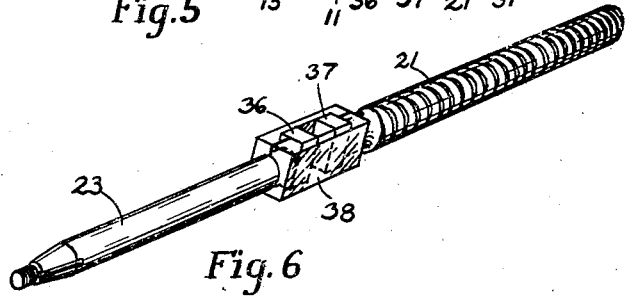
Fig. 6 is a perspective view of the assembled control rod, adjusting screw, and cage used in the embodiment of Fig. 5.

In the preferred form of reversing gear shown in Fig. 5, continuous operation in each direction can be obtained as in the reversing gear just described by longitudinal movement of the control rod or shaft 23, providing the shaft is permitted to rotate freely. In addition to this method of operation, the piston can be moved a given distance longitudinally by a corresponding rotative movement of shaft 23. In this device, shaft 23 has at its forward end a T-head 36. This and a similar T-head 37 at the rear end of reversible adjusting screw 21 are held limitedly slidably in the cage 38. These parts are shown more clearly in perspective in Fig. 6. Cage 38 serves in tension as a tie between the shaft and the screw, and also serves to transmit rotation between these parts and the large hollow locking screw 31, Fig. 5. The cage fits slidably within a portion of this screw which is suitable keyed, splined, or squared as shown. The locking screw 31 is threaded directly into the piston 10, while the adjusting screw 21 is threaded into a nut 39 which is rigidly supported by an inner trunk 40 attached at its right end to, or forming a part of, trunk 8. This trunk passes through the stuffing box 14 in the front head 13 of the cylinder 11 and is integral with piston 10 within the cylinder. Over the rear head 15 of the cylinder is located a suitable seat 41, which may be demountable, for the slide valve 16. Longitudinal movement or positioning of this valve is governed by the operating arm or cage 35 which is rotatably mounted on the hollow shaft portion 42 of, or attached to, screw 31. The hollow shaft portion 42 is rotatively and slidably mounted on control rod 23, the rear end of which extends through a stuffing box 26 in the rear head 15. Within cage 35 is a collar 32 on shaft 42, and suitable thrust bearings 33 and 34 to transmit longitudinal movement from screw 31 and shaft 42 to operating arm 35 and thence to valve 16. As shown, reservoir 99 is connected through locking valve 100 to valve chest 17, and when valve 16 is moved to the left, port 27 is uncovered, allowing fluid to pass through valve seat 41. There is a cavity 28 in the bottom of the valve which connects port 27 and exhaust port 29 when the valve is correctly positioned. In the cylinder are connections 43 and 44, the former piped to locking valve 100 to release fluid pressure from the left end for locking as described below, and the latter piped directly to the reservoir 99 for admitting fluid to the right end when the piston moves toward the left, and releasing fluid when the piston moves toward the right, to maintain working pressure on the right side of the piston as described previously.

When, in the reversing gear shown in Fig. 5 control shaft 23 is thrust to the right a sufficient distance, the space between its T-head 36 and the T-head 37 of screw 21 is taken up and the screw 21 is driven into nut 39 which is rigidly connected with the piston. If the piston and hence this nut remain stationary, and if the screw is reversible and threaded right hand as shown, and if shaft 23 is permitted to rotate freely, screw 21 will rotate clockwise. So, too, will cage 38, and hence will shaft 23 and screw 31, rotate clockwise. If screw 31 is threaded right hand like screw 21, and if it has the same lead per revolution it will advance and enter piston 10 the same distance that screw 21 enters nut 39. As it advances through its hollow shaft portion 42, collar 32, thrust bearings 34 and operating arm 35, it carries the valve 16 to the right.

It is to be understood that the head of screw 31 is sufficiently removed from head 15 so there is sufficient room for longitudinal motion of 31 to operate the valve, and also sufficient room so as to be moved longitudinally by the piston, so that screw 21 can be rotated by the piston and thus rotate 31, before it (31) comes in contact with head 15, a condition which would otherwise prevent initial rotation of 21 by the piston.

Now since the arrangement of this valve and the porting of the seat is the reverse of that shown in Fig. 4, this positioning of the valve to the right will exhaust fluid from the left end of the cylinder and result in operation or movement of the piston to the left. Similarly a positioning of the valve to the left would result in forward operation or movement of the piston to the right. The object of this arrangement will appear later.

Assuming the control rod and hence the valve have been moved to the right as first described, if the rod 23 is held longitudinally fixed in this operating position, but rotatively free, the piston 10 and hence nut 39 moves toward the left. This movement of the nut to the left continues to rotate screw 21 clockwise, which in turn continues to rotate the large hollow screw 31 clockwise into the moving piston as fast as it moves. Therefore there will be no longitudinal movement of parts other than the piston, trunk, and parts attached thereto, and the valve will remain open so operation is continuous within the limits of the piston stroke. Continuous operation in a forward direction is similar.

If it is desired to make a minor or very precise change of adjustment with this reversing gear, the method of operation described above need not be employed. Piston movement may be effected by rotation of control rod 23 and will correspond to this movement. If the rod is rotated clockwise, through T-heads 36 and 37 and cage 38, screws 21 and 31 will be rotated clockwise also, and the latter screw will move the valve to the right through the means described above. This will start operation or movement of the piston to the left. If rod 23 and hence the screws are not rotated further, this movement of the piston will carry the screws and hence the valve 16 back to non-operative central position. Therefore, to continue operation by this means it is necessary to continue rotation of the control rod. Operation of the reversing gear as shown to the right is effected by counter-clockwise rotation of the control rod or shaft. Sufficient longitudinal clearance is provided as shown between the T-heads 36 and 37 and the cage 38 to permit longitudinal movement of screw 21 corresponding to the valve travel without affecting control rod 23.

When it is desired to lock the piston of the reversing gear of Fig. 5 in place, the supply of fluid from reservoir 99 to the valve chest 17 is shut off, and fluid pressure in the left end of the cylinder is released through connection 43, and valve 100 to atmosphere by turning the valve through 90° from the position shown. This cuts off the fluid supply to valve chest 17 at the same time. Pressure being relieved from the left of the piston and not from the right, the piston is driven toward the left. It carries with it small pitch irreversible screw 31 and the attached or integral hollow shaft 42 and its collar 32. This collar, through thrust bearings 33 drives cage 35 back against surface 45 of the rear head 15. Thus the fluid pressure acting on the right of the piston resists any outside force tending to move the piston to the right, and maintains contact between the above-mentioned parts which prevents movement of the piston to the left. Observe, however, that in locking the reverse gear, the piston and valve are moved to the left a short distance from their normal non-operative position or adjustment.

A controlling device which will deliver rotative or longitudinal movement in the desired direction to a shaft or part attached to a hub or flange upon rotation of the proper wheel, crank, or other rotative means, is shown in Fig. 7. It is suitable for controlling the power means or reversing gear shown in Fig. 5, for which it is primarily intended. If constructed as shown the device will automatically deliver a longitudinal thrust through the flange 47 when this flange has rotated through a predetermined number of turns. When properly used in connection with one of the reversing gears as described, this capacity of the controlling device shown in Fig. 7 serves to center the reversing gear valve before the piston reaches the limit of its stroke.

The controlling device consists of a shaft 50 which is supported in bearings in the frame or bracket 51. One end of this shaft is slidably keyed or squared as shown at 52. To the other end is attached a wheel or other rotative means 48. On a portion of shaft 50 between the bracket 51 and wheel 48 is rotatably mounted another wheel 49 and hollow screw 53 attached thereto. These parts 49 and 53 are located on the shaft by the spring centering device 54 shown. This device transmits longitudinal thrust. The helical spring acts in compression only. This device tends to hold the screw in one longitudinal position, but permits it to slide along shaft 50 if sufficient pressure is applied to it. Screw 53 is threaded into crosshead 55, to which rods 56 and 57 are rigidly attached. These rods pass through bracket 51 as a guide to crosshead 58 at the forward end. A flange or collar within this crosshead, through suitable thrust bearings 59 or 60, transmits longitudinal movement or thrust to the sleeve 61 or flange 47. These parts are free to rotate within the crosshead. The interior of sleeve 61 is slidably keyed to the end portion 52 of shaft 50 and transmits rotation from the shaft to flange 47 of the sleeve.

Longitudinal movement of shaft 50 in the bracket is prevented by suitable thrust bearings 62 and 63 as shown. A portion of the shaft, preferably between these bearings, is threaded as shown at 64 to actuate the nut or indicator block 65. Since this block is prevented from rotating by suitable guides such as the rods 56 and 57 passing through it as shown, its longitudinal movement caused by rotation of screw 64 within it indicates the position of a reversing gear piston and valve gear adjustment. Stop collars 66 to 69, inclusive, are adjustable and set on rods 56 and 57 so that two of them will come in contact with the moving indicator block 65 shortly before the reversing gear piston reaches the end of its stroke.

When the wheel or rotative means 48 is rotated clockwise, through shaft 50 and its key portion 52, sleeve 61 and flange 47 will be rotated clockwise. Similarly counter-clockwise rotation will be transmitted from part 48 to 47. When means 49 is rotated clockwise, if its portion 53 is threaded left hand, crosshead 55 will be driven to the right. This, through rods 56 and 57, crosshead 58 and thrust bearing 60, will drive flange 47 and attached parts to the right. If the device is properly connected to a reversing gear of the form shown in Fig. 5, this motion will start continuous operation of the reversing gear. For this operation flange 47, sleeve 61, shaft 50 and rotating means 48 must be permitted to rotate freely. Counter-clockwise rotation of means 49 will cause a movement of flange 47 to the left, and operation of the reversing gear in the reverse direction, in a similar manner.

If for some reason the flange 47 and attached parts cannot be moved to the right when means 49 is turned clockwise, or pulled to the left when the means is rotated counter-clockwise, screw 53 in the stationary crosshead 55 and means 49 will turn and move to the left, compressing the spring in the centering device 54. This leftward movement and spring compression will also result when the piston in the reversing gear reaches the rear end of its stroke, if properly connected to the controlling mechanism. This will be caused by rotation of screw 64 of shaft 50 carrying block 65 to the left against the stops 66 and 68. These, through rods 56 and 57, will thrust crosshead 55, screw 53 threaded into it, and the wheel or rotative means 49 to the left. Rotation and thrusts in the opposite direction will give corresponding results.

Figure 8:
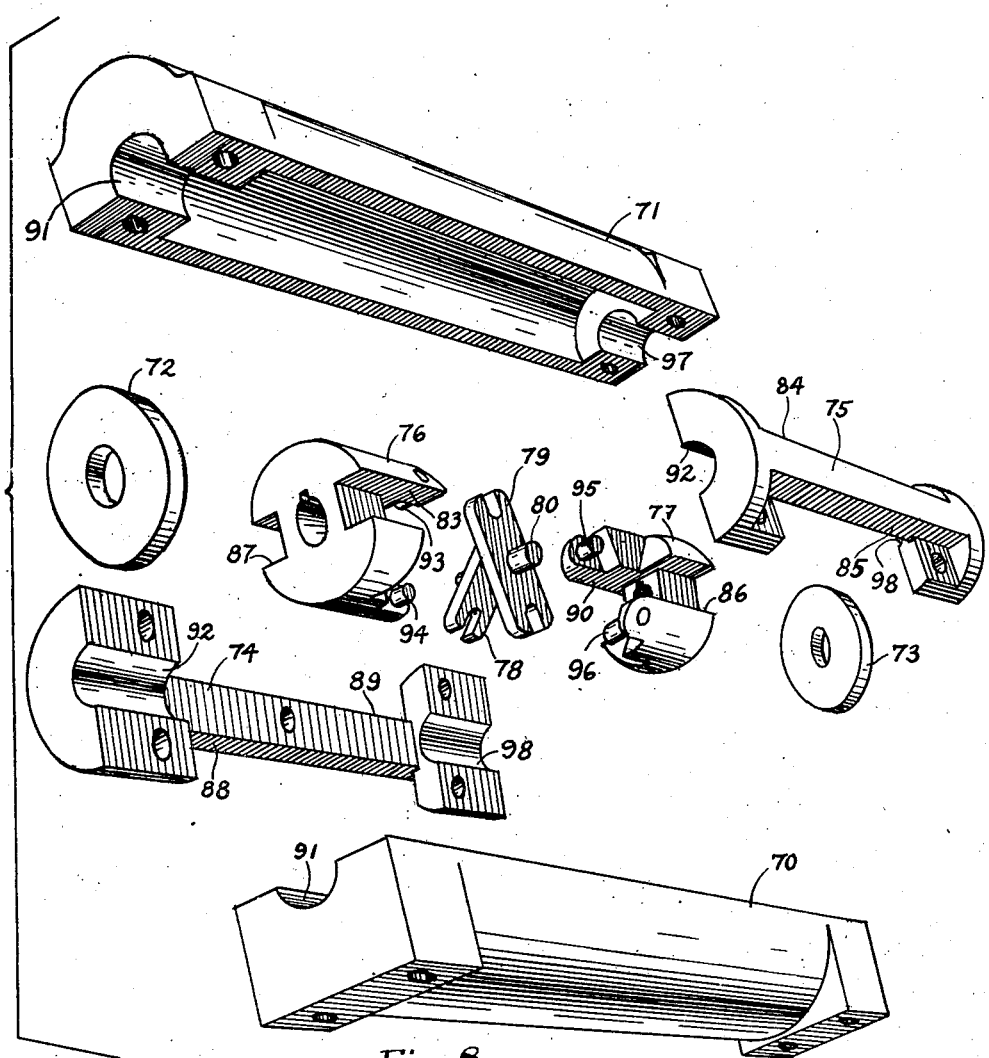
Fig. 8 shows the dis-assembled parts.

The dis-assembled parts of a device for transmitting rotation and reversing thrust or longitudinal movement are shown in Fig. 8. The complete device includes a bearing bracket 70 and cover plate 71, (numbered generally as 6 in Fig. 1) thrust bearings 72 and 73, frame comprising two similar parts 74 and 75, knuckles 76 and 77, and one or more levers 78 and 79 on a fulcrum pin 80 which is supported at its ends in the frame. The ends of the levers 78 and 79 are slotted to engage pins in the knuckles 76 and 77. The ends of the shafts 81 and 82, shown in the section Fig. 11, are supported in bearings in the bracket 70 and cover plate 71 and in turn support or act as radial bearings for the thrust bearings 72 and 73, and the frame parts 74 and 75. To these shaft ends 81 and 82 are keyed or otherwise rigidly attached the knuckles 76 and 77 respectively. Other parts of the assembly include bolts and nuts or other suitable fastenings, not shown in Fig. 8.

If the rear end shaft 81, Fig. 9, is rotated clockwise, it will rotate knuckle 76 in the same direction. Then surface 83 in the groove of the knuckle provided to receive the side bar of frame part 75, will bear down on surface 84 of the side bar. The pressure will be transmitted through the bar and its surface 85 to surface 86 of knuckle 77. At the same time surface 87 of knuckle 76 will press upwardly on surface 88 of frame part 74. This pressure will be transmitted through the side bar of part 74, by its surface 89 to surface of knuckle 77. These pressures on surfaces 86 and 90 tend to rotate knuckle 77 and shaft 82 attached thereto clockwise. Frame 74—75, levers 78 and 79, and pin 80 will rotate in the same direction. In a similar manner, counter-clockwise rotation of shaft 81 will be transmitted to shaft 82.

If shaft 81 is thrust to the right, it will slide in through bearing 91 of bracket 70 and its cover plate 71, through thrust bearing 72, and through bearing 92 in frame 74—75 and carry knuckle 76 to the right, sliding on the frame side bars. Then the knuckle pins 93 and 94 engaging slots in, respectively, the top of lever 79 and the bottom of lever 78, will swing these levers, respectively, clockwise and counter-clockwise (in the view shown in Fig. 9) about fulcrum pin 80. Frame 74—75 and hence pin 80 have no movement longitudinally with respect to the assembly. Hence the rotation of levers 78 and 79 will pull knuckle 79 to the left by knuckle pins 95 and 96, engaging slots in the lever ends opposite those mentioned above. The resulting movement of knuckle 77, sliding on the frame side bars, will draw the attached shaft 82 to the left through bearing 97 in bracket 70 and cover 71, through thrust bearing 73, and through bearing 98 of frame 74—75. A thrust or movement of shaft 81 to the left will produce thrust or movement of shaft 82 to the right in a similar manner.

If knuckles 76 and 77 are alike as regards spacing of their pins 93, 94, 95 and 96, as shown, longitudinal movement of shaft 81 will be equal and opposite to that of shaft 82. If the pins on one knuckle are nearer to the axis or center line than those on the other knuckle, however, and the levers are made proportional, the movement of the two shafts will be in proportion.

It is to be understood that the present disclosure is for the purpose of illustration only, and that the invention is not limited thereto. To those skilled in the art, many modifications of the invention will be readily apparent, and it will also be obvious to such skilled persons that parts of the device may be used without other parts thereof, many such combinations readily suggesting themselves. Therefore, it should be and is to be distinctly understood that for a definition of the limitations of the invention, reference must be had to the appended claims.

Having now described the invention, what is claimed as new and for which Letters Patent of the United States is desired, is:

1. In combination with a cylinder and piston therein, power delivering mechanism including a screw of irreversible pitch threaded into the piston, means for rotating the screw and means for transmitting its longitudinal movement to a control valve, said screw-rotating means including a screw of reversible pitch also threaded into the piston and means for transmitting rotation from one screw to the other.

2. In combination with a cylinder and piston therein, power delivering mechanism including a screw of irreversible pitch threaded into the piston, means for rotating the screw and means for transmitting its longitudinal movement to a control valve, said screw-rotating means including a reversible screw also threaded into the piston, and means for manually rotating one screw, said means being operatively connected to said last named means, and other means of longitudinally positioning the reversible screw.

RALPH H. SHEPARD.